US007523859B2

(12) United States Patent
Patel et al.

(10) Patent No.: US 7,523,859 B2
(45) Date of Patent: *Apr. 28, 2009

(54) SYSTEM AND METHOD FOR SECURING TRANSACTIONS IN A CONTACT CENTER ENVIRONMENT

(75) Inventors: Labhesh Patel, Mountain View, CA (US); Shmuel Shaffer, Palo Alto, CA (US); Cullen Jennings, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/860,705

(22) Filed: Sep. 25, 2007

(65) Prior Publication Data

US 2008/0011823 A1    Jan. 17, 2008

Related U.S. Application Data

(63) Continuation of application No. 10/902,614, filed on Jul. 28, 2004, now Pat. No. 7,287,692.

(51) Int. Cl.
*G06K 5/00* (2006.01)
(52) U.S. Cl. .................... 235/380; 235/379; 705/39; 705/64
(58) Field of Classification Search .............. 235/379, 235/380; 705/1, 26, 35, 39, 40, 44, 64
See application file for complete search history.

(56) References Cited

U.S. PATENT DOCUMENTS 6,339,766 B1    1/2002   Gephart
6,636,833 B1    10/2003  Flitcroft et al.
6,980,969 B1    12/2005  Tuchler et al.
7,107,242 B1    9/2006   Vasil et al.
7,136,835 B1    11/2006  Flitcroft et al.
7,287,692 B1 *  10/2007  Patel et al. ............ 235/380

FOREIGN PATENT DOCUMENTS

WO    02/054656 A2    7/2002

OTHER PUBLICATIONS

TechTarget "VoIP: Secure Electronic Transaction", Copyright Jun. 7, 2002, 4 pages.

* cited by examiner

*Primary Examiner*—Daniel A Hess
(74) *Attorney, Agent, or Firm*—Trellis IP Law Group, PC

(57) ABSTRACT

A system and method for protecting confidential user information employed in an electronic transaction. The system and method provide for associating an expiration time/time period, use or other use-limiting authorization indicator with a credit card or other user information to be transferred to a user information recipient, in conjunction with a product/service payment or other business transaction with a hosted contact center. Embodiments of the invention further provide for forming a limited-use indicator, such as a use-limiting token, by associating a transaction agent indicator and a use-limiting indicator with the user information, and for verifying a limited use indicator received from a contact center agent and determining according to such indicator, in addition to any ordinary verification that might also be conducted, whether the use limitation has been met and whether the transaction should be authorized in accordance with the use limitation.

20 Claims, 8 Drawing Sheets

SYSTEM AND METHOD FOR SECURING TRANSACTIONS IN A CONTACT CENTER ENVIRONMENT

CROSS REFERENCES TO RELATED APPLICATIONS

This application is a continuation of the following application, U.S. patent application Ser. No. 10/902,614, entitled System and Method for Securing Transactions in a Contact Center environment, filed on Jul. 28, 2004, now U.S. Pat. No. 7,287,692 which is hereby incorporated by reference, as if it is set forth in full in this specification:

BACKGROUND OF THE INVENTION

1. Field of Invention

This invention relates in general to restricting the use of information and more specifically to ensuring the security of commercial transactions.

2. Description of the Background Art

Protecting electronically transferred information from unwanted use by third parties is becoming critical to the success of today's commerce. One approach is to prevent eavesdropping, or unwanted access to information. Another approach is to obscure, or otherwise limit the usefulness of information that might be intercepted. These approaches can be used together in varying ways to achieve a desired level of security. For example, anti-eavesdropping mechanisms include securing a communication link for coupling a user with an intended party (e.g., by implementing a security protocol such as H.325, IPSEC, etc.). Information can be obscured by encrypting the user information (e.g., by using symmetric or asymmetric keys) so that if intercepted, the encrypted user information will be more difficult for an eavesdropper to decipher.

User information misuse problems can arise in situations where, for example, a contact center agent rightfully acquires credit card or other user information for use in contact center services, but then uses the information for additional purchases or other unauthorized purposes. To make matters more complicated, the user might be unaware that he or she is communicating with a contact center rather than a seller or other product/service provider. The contact center might further be located outside of the country in which the person resides, or believes is one in which he or she is conducting financial or other business transactions. Furthermore, a contact center might have a high attrition rate and high turnover of agents, thus increasing the potential that a disgruntled agent might leave his or her job with a list of credit card numbers or other user information that he or she might then misuse. One current approach is for the agent to provide an identifier that identifies the agent to the user prior to the user supplying user information to the agent. However, this approach merely notifies the user as to the identity of an agent that might nevertheless misuse the user information. Worse yet, the identifier that the agent provides may well be fictitious.

SUMMARY OF EMBODIMENTS OF THE INVENTION

Embodiments of the present invention provide a system and method for associating a use-limiting authorization indicator (e.g., an expiration time, or a time period) with credit card or other user information to be transferred to a user information recipient in conjunction with a product/service payment or other business transaction Embodiments of the invention further provide a system and method for forming a limited-use indicator, such as a use-limiting token, by associating a transaction agent indicator and a use-limiting indicator with the user information. Embodiments of the invention also provide for verifying a limited use indicated by a limited-use indicator received from a transaction agent and determining according to such indicator, in addition to any ordinary verification that might also be conducted, whether the use limitation has been met and whether the transaction should be authorized in accordance with the use limitation. Embodiments of the invention still further provide a system and method that are capable of being integrated with ordinary business transactions or interception avoidance, infiltration avoidance or other privacy mechanisms, and that can be used in a hosted or other contact center environment.

A method according to an embodiment of the invention provides for initiating a user transaction in an electronic transactional system employing confidential user information of a user, associating a transactional limitation with the confidential user information to produce an authorization indicator, and transmitting the authorization indicator to a recipient.

A system according to an embodiment of the invention includes a transactional limiting engine for determining a transactional limitation, and an associating engine for associating the transactional limitation with confidential user information of a user to produce an authorization indicator.

Embodiments of the invention further provide a machine-readable medium having stored thereon instructions for initiating a user transaction in an electronic transactional system employing confidential user information of a user, associating a transactional limitation with the confidential user information to produce an authorization indicator, and transmitting the authorization indicator to a recipient.

Advantageously, embodiments of the invention enable a contact center or other business transaction agent to rightfully receive credit card or other user information from a user for purposes of conducting a business transaction, while also avoiding misuse of the user information by the agent or another person/entity to whom the agent might provide the user information. Embodiments of the invention further enable tracking of business transactions in accordance with actual or attempted use of user information, or agents conducting transactions, or further, for determining contact center or agent specific limited uses or authorizing or tracking variances of a limited-use in conjunction with such transactions. Embodiments of the invention still further enable transactions to be conducted in an otherwise conventional manner while employing limited-use security. Among other advantages, embodiments of the invention enable a user to conduct commerce or other business transactions with greater confidence such that user information provided for use in conjunction therewith will not be misused, thereby increasing the willingness of users to engage in such business transactions.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Figure 1:
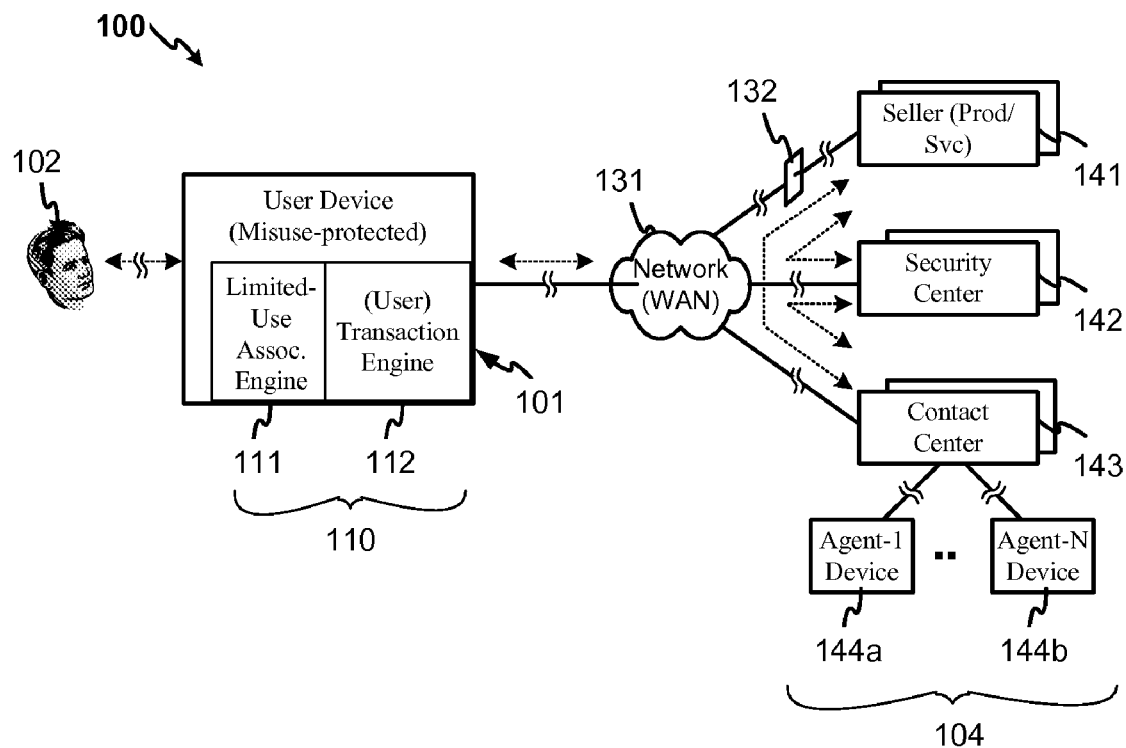
FIG. 1 is a flow diagram illustrating a misuse avoidance system according to an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal digital assistant (PDA), personal data manager or "PDM" (also referred to as a personal information manager or "PIM") smart cellular or other phone, so-called smart card, set-top box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Figure 2:
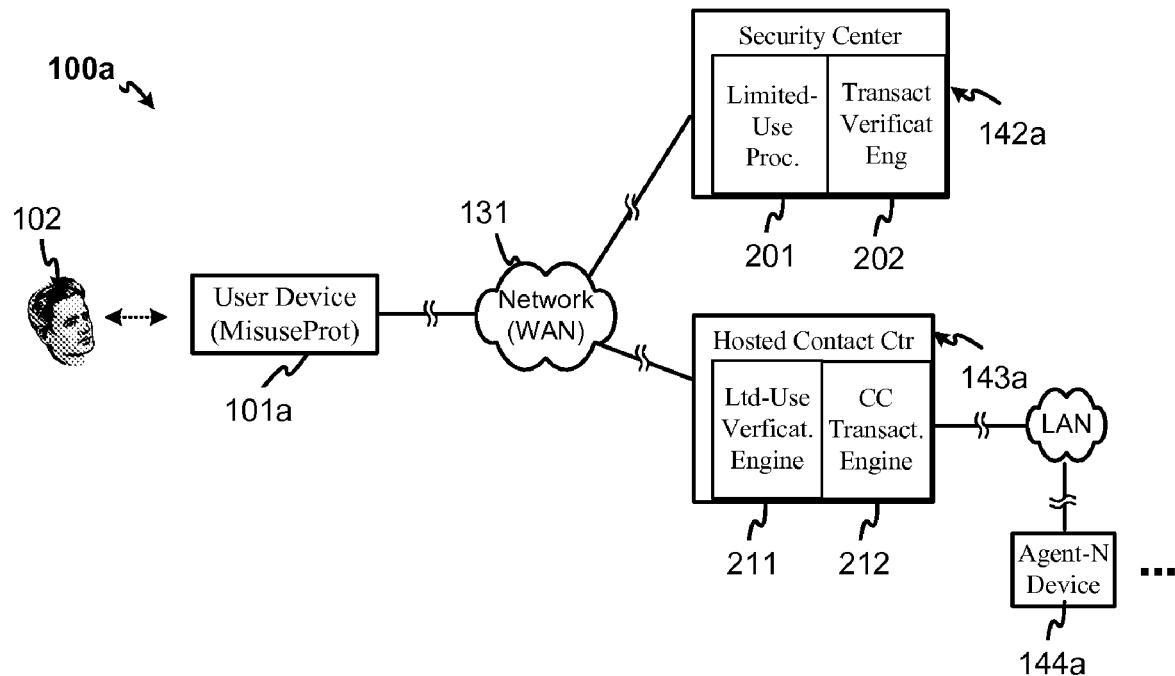
FIG. 2 is a more particular flow diagram illustrating a security center and a hosted contact center of the misuse avoidance system in accordance with an embodiment of the invention.

Referring now to FIGS. 1 and 2, there are seen flow diagrams of a transaction system 100 employing misuse avoidance through the use of a limited use indicator according to an embodiment of the invention. Referring now more particularly to FIG. 1, transaction system 100 includes at least intermittently communicatingly coupled components comprising user device 101, network 131 and business services or systems 104. Firewall 132 further illustrates how other security mechanisms can also be used in conjunction with one or more of system 100 components in accordance with the requirements of a particular application. Other security mechanisms can, for example, include but are not limited to such commonly used security mechanisms as anti-eavesdropping, anti-spoofing or other anti-interception security, anti-intrusion security (e.g., firewall, sandbox, fire-zone, and the like), and so on, or combinations thereof. Various other components may also be used and include but are not limited to, routers, gateways, backup/restore systems, network configuration/re-configuration, and so on, in accordance with the requirements of a particular application. Such components are well known and are not shown so as not to obscure aspects of the present invention. It is to be understood that the terms "or" and "portion" as used herein are intended to include "and/or" and "in whole or contiguous or non-contiguous part" respectively, unless otherwise indicated or unless the context clearly dictates otherwise.

System 100 broadly provides for misuse protected user device 101 to be utilized by user 102 to conduct one or more business transactions via network 131 with one or more of business services or systems 104. As depicted by FIG. 1, an exemplary business transaction includes a user selecting a product or service from a seller business service for purchase, and paying for the purchase using funds managed by a financial concern business service (e.g., a credit card company, bank, and so on). The seller business service utilizes a contact center operated by agents of a third party business service (hereinafter, a "hosted" contact center) that is a distinct entity from the seller business service in order to consummate business transactions with users on behalf of the seller. In the present example, the seller has delegated some or all of user payment processing to the contact center. The financial concern has further delegated a financial concern or third party operated security center to facilitate securing user information against misuse by a contact center agent conducting a business transaction with the user, and for verifying a user's authorization to engage in a particular transaction and the contact center agent's authorization to use the user's payment information in conjunction with the transaction.

It will be appreciated that embodiments of the present invention enable a business transaction portion, such as paying, product selecting, transferring of user information, product returns, crediting, and so on, to be conducted synchronously or asynchronously, as well as independently or in combination with other transaction portions. It is to be understood that synchronous or asynchronous communication, transfer of party information or other conducting of one or more transaction portions is not inhibited and can be conducted in an otherwise conventional manner not inconsistent with the teachings herein. For clarity sake, the terms "transaction" or "business transaction" will include a transaction portion or business transaction portion unless the context clearly indicates otherwise. It will also become apparent that aspects of the present invention are applicable to a wide variety of other transactions that might be conducted. However, while not intended to be construed as limiting, the above transaction will be used throughout the discussion as a consistent example, so that embodiments of the present invention might be better understood.

User device 101 provides for associating a limited-use indicator with payment (e.g., credit card, electronic check, and so on) or other user information that may be communicated to one or more of business systems 104 for use in conducting a business transaction with business systems 104. The limited-use indicator preferably includes at least a one-time limitation or "time indicator", for example, one or more of an expiration time/date, a time period extending from a time the user device communicates with a security center (e.g., for obtaining the limitation), a time period extending from a time the security center or user device generates or time-stamps the limitation or limited-use indicator, a time period extending from a user initiating a transaction portion with a seller service or contact center, and so on, in accordance with the requirements of a particular application. It will be appreciated, however, that one or more other limitations can also be used alone or in conjunction therewith, including but not limited to one or more of agent identifiers corresponding to seller, security center or contact center agents, a transaction type or other parameter (e.g., user, seller or contact center transaction, misuse or variance history, a product/service type or other parameter, such as, necessities versus non-necessities, legal versus non-legal, etc., and so on, in accordance with a particular application). Since user information is presumed to be transferred for use in conducting a transaction exemplified by various business transactions and not for unauthorized or other misuse by the recipient, user information is also referred to herein as "confidential user information".

User device 101 further provides, if an electronic business transaction portion is conducted, for conducting user participation in the business transaction. Such conducting of a business transaction can, for example, include establishing a communications link with at least one corresponding business system and, if user information is to be transferred, transferring the user information and the limited-use or "authorization" indicator to the business system. User device 101 can still further provide for storing user or business system information, including but not limited to one or more of user information, limited-use (authorization) indicators, business system identification information and transaction information.

User device 101 can include a suitable computer system that is capable of conducting the associating of the user information and limited-use indicator, and of conducting the business transaction. User device 101 can further include a suitable computer system that is capable of storing user or business system information in implementations in which such information is stored by the user device. (Such user device can include a so-called smart card or other computing system in accordance with the requirements of a particular application, including but not limited to those specifically noted herein.)

User device 101 includes limited-use association engine 111 ("association engine") and transaction engine 112. Association engine 111 provides for directly or indirectly conducting the associating of confidential user information with a use-limitation, or further, with an agent identifier or other information. Transaction engine 112 provides for conducting processing to perform the business transaction in conjunction with association engine 111 operations and for interfacing with network 131.

Network 131 can include one or more statically or dynamically configurable wired or wireless networks that can also include so-called virtual networks for providing at least intermittent communication between user device 101 and one or more of business systems 104 for conducting an interaction portion. A wide area network or "WAN" and more preferably the Internet will generally be presumed to couple user device 101 with at least two of business systems 104 so that embodiments of the invention might be better understood. It will be appreciated, however, that substantially any WAN, local area network ("LAN"), private network, telephone network, and so on, or some combination can also be used in accordance with the requirements of a particular application.

Business systems 104 include seller systems, security systems and hosted call centers. Seller system 141 can, for example, include a server hosting a seller's product or service Website, which Website is useable in a conventional manner by a user of a computer system for selecting or initiating a purchase of a seller's products or services. Security center 142 includes a server hosting a security service that provides for verification of user payments and for implementing limited-use security. Call center 143 includes a server hosting a hosted or other call center service that provides for conducting payment transactions with users and for conducting user payment verification with the security center 142.

It will be appreciated that more than one of business systems 104 are capable of being implemented using shared components, for example, using a common server to provide an Internet website for various sellers, security systems and contact centers or combinations of these or other business system types. It will become apparent, however, that while business services of a same type might typically be hosted by shared components, in one embodiment, additional security and cross-verification is preferably be achieved by separate control of the security center versus the seller service or hosted contact center, or more preferably, separate servers are used for implementing the security center and the seller service or hosted contact center.

FIG. 2 illustrates security center and hosted contact center embodiments in greater detail. As shown, security center 142 includes limited-use processor 201 and transaction verification engine 202. Limited-use processor 201 provides a mechanism for generating limited-use identifiers usable by a user (i.e., or user device) for assuring limited use of a user's confidential user information in conjunction with a transaction (e.g., credit card number, electronic check, and so on).

In specific embodiments, limited use tokens or identifiers can be generated from any suitable information relating to different aspects of a transaction. In a preferred embodiment, a typical transaction involves three entities: a user (purchaser), an agent (seller) and a provider (i.e., person or entity) of a limited use token. The limited use token authorizes a purchase to be charged to a user (e.g., to a credit card) under conditions that are dependent upon anticipated or actual characteristics of the purchase. For example, item or service identification, geographic location or entity name or other identification of the agent, a serial number or ID of the agent, user identification, valid time period, etc. can all be limiting factors used in the limited use token. Various aspects of existing encryption and security approaches, including public key infrastructure (PKI), identity-based encryption (IBE) or other security techniques can be used in conjunction with features of the invention. Naturally, other embodiments can vary in the number and type of entities involved in the transaction, limiting factors used, and other specific details provided herein.

Limited-use processor 201 provides for verifying the use of the confidential user information in conjunction with a corresponding transaction, or further, a corresponding hosted contact center agent. Transaction verification engine 202 provides for conducting the processing to perform the business transaction in conjunction with limited-use processor 201.

Hosted contact center 143 includes a limited-use verification engine 211 and a contact center transaction engine 212 ("transaction engine"). Limited-use verification engine 211 provides for conducting ordinary and limited-use verification. Ordinary verification can, for example, include determining of the user's ability to engage in the transaction, including but not limited to whether a user has a valid account with the financial concern and whether the user is authorized to make payment from that account for the present transaction. Limited-use verification includes, for example, determining whether a user transaction should be authorized in accordance with a limited-use indicated by a limited-use indicator associated with the transaction, or further, in accordance with a particular seller service, contact center or agent conducting a transaction portion or other limitations or limitation combinations. Transaction engine 212 provides a mechanism for conducting business transactions with users and for conducting communications in conjunction with the aforementioned verifying.

Figure 3A:
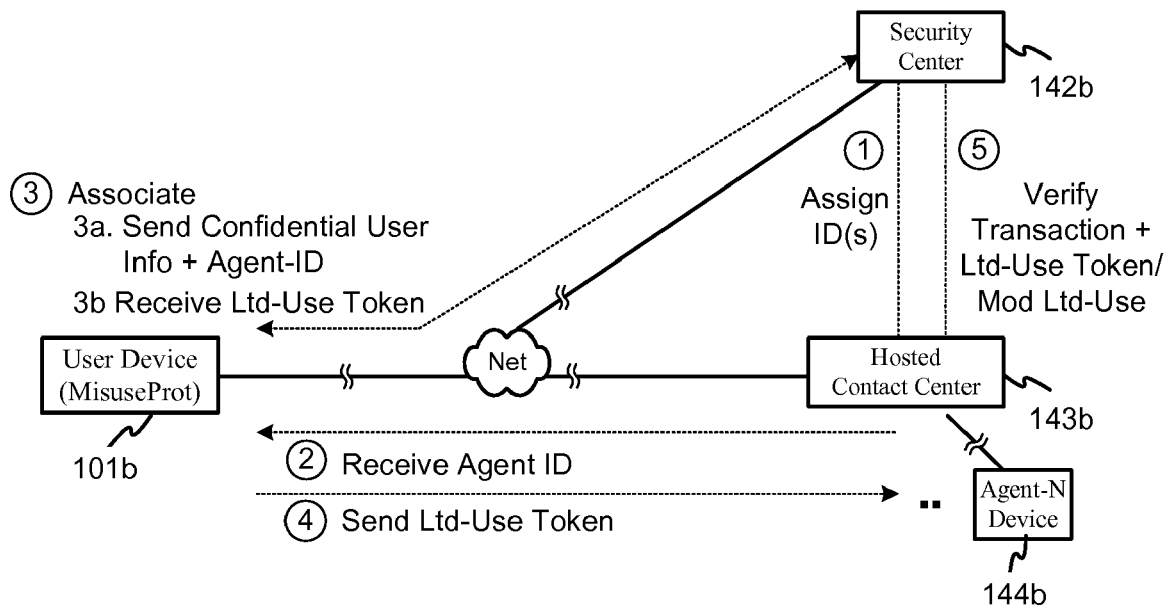
FIG. 3A is a flow diagram in accordance with an embodiment of the invention illustrating a business transaction.
Figure 3B:
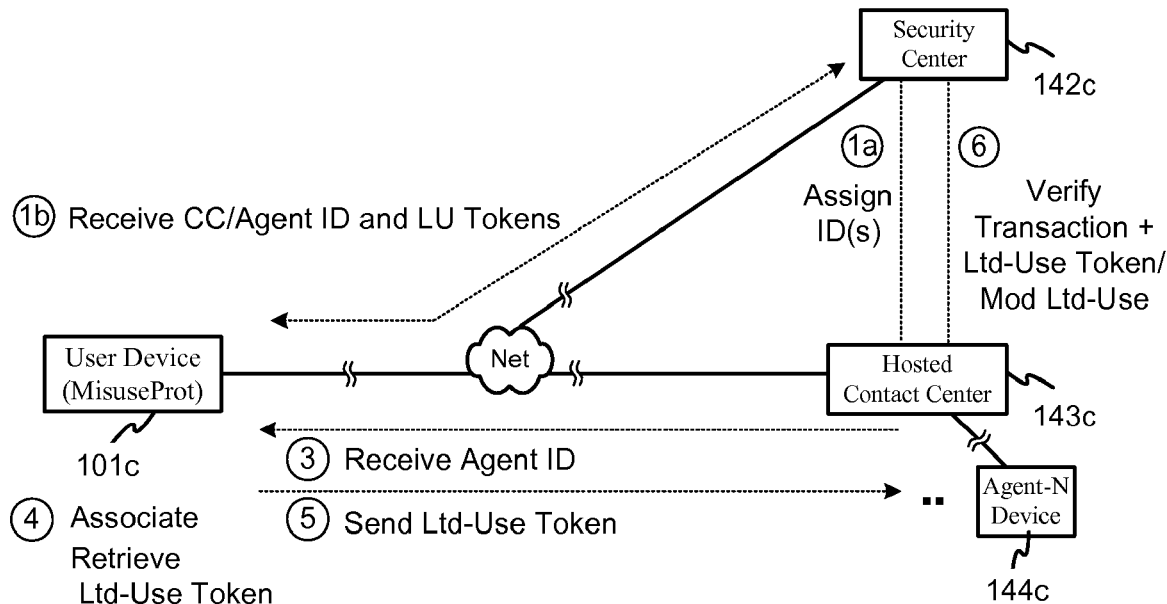
FIG. 3B is a flow diagram in accordance with an embodiment of the invention illustrating a business transaction where a token is obtained from a token list stored at a user device.

The flow diagrams of FIGS. 3A and 3B illustrate business transaction portions according to embodiments of the invention. The FIG. 3A embodiment employs indirect associating and per transaction limited-use security embodiments, while the FIG. 3B embodiment employs direct associating and lockstep limited-use security embodiments.

As shown in FIG. 3A (and FIG. 3B), while a hosted contact center 143*b* will typically operate on behalf of a seller and not a security center, embodiments of the invention nevertheless provide for a security center 142*b* operating, for example, on behalf of a financial concern to provide for assigning to one or more (preferably each) contact center agent 144*b* a unique agent identifier. When a user uses user device 101*c* (e.g., a smart card, PDA, PC, and so on) for conducting a transaction with a contact center agent, the user device 101*b* receives from the contact center a unique agent identifier identifying the contact center agent 144*b* who is conducting the transaction. The user device 101*b* associates with the agent identifier (and optionally, a contact center, transaction or other further identifier) the user's confidential information (e.g., credit card number, electronic check, key, and so on). In the present embodiment, such associating includes the user device 101*b* communicating the agent identifier and the user's confidential information to security center 142*b* and receiving from security center 142*b* an encoded limited-use or "authorization" token corresponding to the agent identifier and the user's confidential information. (Such token provides an embodiment to the above discussed limited-use or authorization indicator.) The user device 101*b* further sends the user's confidential information (e.g., credit card information) as well as the limited-use token to the hosted contact center 143*b*.

The hosted contact center agent 144*b* then receives the user's confidential information and the limited-use token and thereafter initiates a verification by making a verification request to security center 142*b*. The verification request includes sending ordinary verification information including sending the confidential user information to the security center 142*b*, as well as sending limited-use verification information including the limited-use token. Verification further includes receiving from the security center a response including at least one verification indicator indicating whether the transaction is generally or "ordinarily" allowable (e.g., according to the confidential user information or other information), as well as whether the transaction is allowable in accordance with the limited-use indicated by the limited-use token.

It should be noted that the embodiments of the present invention depicted in FIGS. 3A and 3B do not require contact center decoding of the limited-use token, and further prefer obviating an ability of the contact center to decode the limited-use token, such that the unaltered token "flows through" the contact center to the security center at a verification initiation time. (Such time can further, for example, be compared by the security center with a time-based limited-use indicator to determine whether to authorize the transaction on the basis of limited-use.) The ordinary information can, for example, include the user's credit card number and a purchase price for which payment is requested.

In the embodiment of FIG. 3B, prior to the conducting of a transaction portion between a user and hosted contact center 143*c*, security center 142*c* again, as in the FIG. 3A embodiment, provides for preferably assigning to each contact center 143*c* agent a unique agent identifier for use in conducting transactions with agent device 144*c*. If desired, security center 142*c* can generate limited-use tokens corresponding to one or more agents (or agent devices) with whom a transaction is likely to be conducted. Security center 142*c* also provides to user device 101*c* the generated one or more (hereinafter "list" or "group") agent identifiers and the group of generated limited-use tokens, which identifiers and tokens are stored by the user device 101*c*.

When a user 102 initiates or otherwise conducts a transaction with contact center 143*c*, the user device 101*c* receives from contact center 143*c* an agent identifier identifying the agent 144*c* who is conducting the transaction for contact center 143*c*. The user device 101*c* associates the agent identifier (and possibly other contact center or transaction identifiers) with the user's confidential information (e.g., credit card number, electronic check, key, and so on). In the depicted embodiment, such associating includes user device 101*c* retrieving from the stored limited-use token list a limited-use token corresponding to the received agent identifier (e.g., by performing a lookup). User device 101*c* further sends the user's confidential information and the limited-use token to hosted contact center 143*c*.

The hosted contact center 143*c* agent receives the user's confidential information and the limited-use token and thereafter conducts limited-use verification by sending a verification request to security center 142*c*. As shown in the embodiment of FIG. 3A, the verification includes sending the user's confidential information, the limited-use token and any other information ordinarily used for verification by security center 142c. The verification further includes contact center 143c receiving from security center 142c a response including at least one verification indicator indicating whether the transaction is ordinarily authorized in accordance with the user information and any other information, and further, whether the transaction is authorized in accordance with the limited-use token.

It will be appreciated that the embodiment illustrated in FIG. 3B, in contrast with the embodiment illustrated in FIG. 3A, avoids requiring the user device 101c to obtain a limited-use token from the security center 142c in conjunction with conducting each business transaction or "on a per transaction basis". User device 101c further conducts associating directly (e.g., including retrieving a limited-use token) and without also utilizing security center 142c to generate a limited-use token corresponding to the agent identifier received from contact center 143c.

Figure 4:
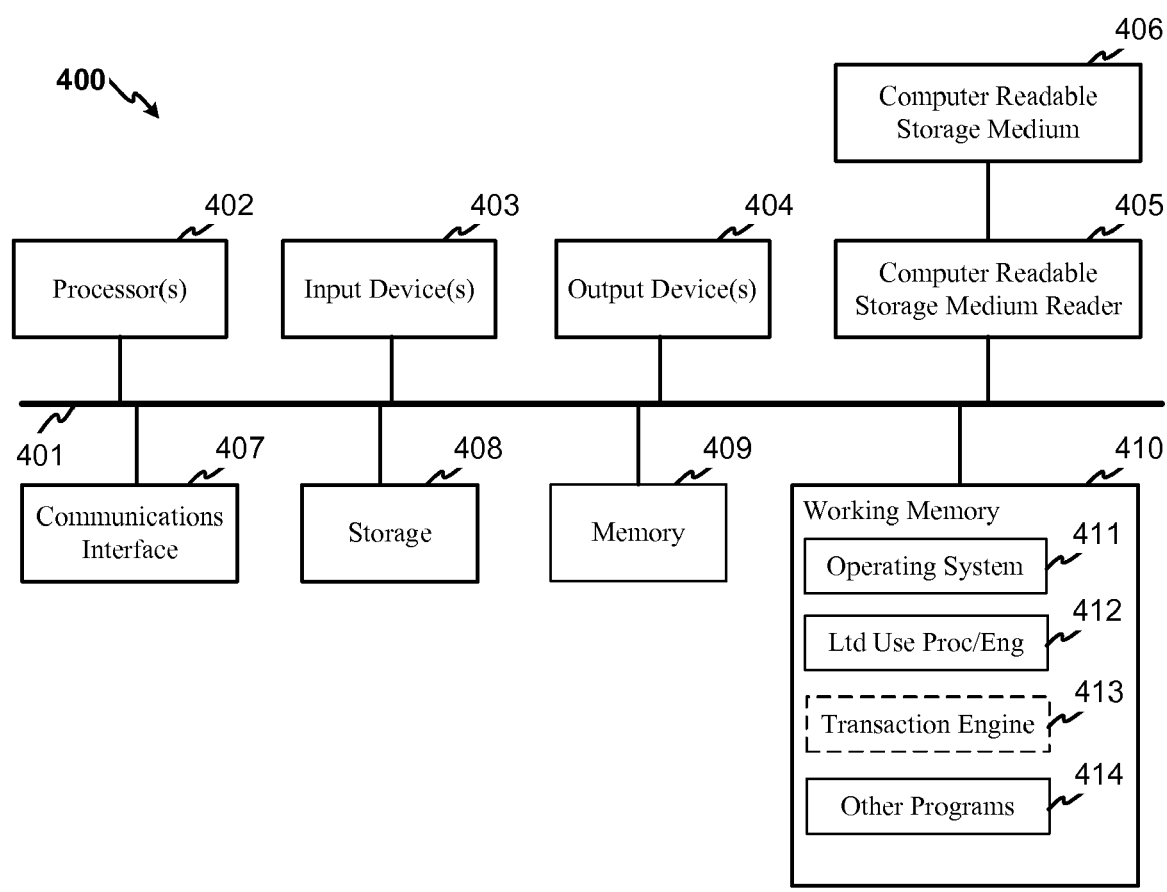
FIG. 4 is a schematic diagram in accordance with an embodiment of the invention illustrating a computer system capable of conducting misuse avoidance.

Turning now to FIG. 4, an exemplary computing system is illustrated that can comprise one or more of the components of FIGS. 1 through 3. While other alternatives might be utilized, it will be presumed for clarity sake that components of the systems of FIGS. 1 through 3 and elsewhere herein are implemented in hardware, software or some combination by one or more computing systems consistent therewith, unless otherwise indicated.

Computing system 400 comprises components coupled via one or more communication channels (e.g. bus 401) including one or more general or special purpose processors 402, such as a Pentium®, Centrino®, Power PC®, digital signal processor ("DSP"), and so on. System 400 elements also include one or more input devices 403 (such as a mouse, keyboard, microphone, pen, and so on), and one or more output devices 404, such as a suitable display, speakers, actuators, and so on, in accordance with a particular application.

System 400 also includes a computer readable storage media reader 405 coupled to a computer readable storage medium 406, such as a storage/memory device or hard or removable storage/memory media; such devices or media are further indicated separately as storage 408 and memory 409, which can include hard disk variants, floppy/compact disk variants, digital versatile disk ("DVD") variants, smart cards, partially or fully hardened removable media, read only memory, random access memory, cache memory, and so on, in accordance with the requirements of a particular application. One or more suitable communication interfaces 407 can also be included, such as a modem, DSL, infrared, RF or other suitable transceiver, and so on for providing inter-device communication directly or via one or more suitable private or public networks or other components that can include but are not limited to those already discussed.

Working memory 410 further includes operating system ("OS") 411 elements, a limited-use token engine 412, a transaction engine 413 and other programs 414, any of which may include one or more of application programs, mobile code, data, and so on for implementing system 100/100a elements that might be stored or loaded therein during use. The particular OS can vary in accordance with a particular device, features or other aspects in accordance with a particular application (e.g. Windows, WindowsCE, Mac, Linux, Unix or Palm OS variants, a cell phone OS, a proprietary OS, and so on). Various programming languages or other tools can also be utilized, such as those compatible with C variants (e.g., C++, C#), the Java 2 Platform, Enterprise Edition ("J2EE") or other programming languages in accordance with the requirements of a particular application. Limited-use processing engine 412 is discussed elsewhere herein. Transaction engine, which is also discussed elsewhere herein, can, for example, include one or more of an Web browser, add-on, applet, custom software and so on for conducting a transaction and for optionally conducting other interception avoidance, infiltration avoidance and other security including but not limited to the examples discussed elsewhere herein. Such "other security" in addition to limited-use security is also referred to herein as "privacy" security. Other programs 414 can, for example, include one or more of the aforementioned other security, compression, synchronization, backup systems, other browser or groupware code, and so on, including but not limited to those discussed elsewhere herein.

When implemented in software (e.g. as an application program, object, agent, downloadable, servlet, and so on in whole or part), a limited-use or "misuse avoidance" security system or other component can be communicated transitionally or more persistently from local or remote storage to memory (SRAM, cache memory, etc.) for execution, or another suitable mechanism can be utilized, and elements can be implemented in compiled or interpretive form. Input, intermediate or resulting data or functional elements can further reside more transitionally or more persistently in a storage media, cache or other volatile or non-volatile memory, (e.g., storage device 408 or memory 409) in accordance with a particular application.

Figure 5A:
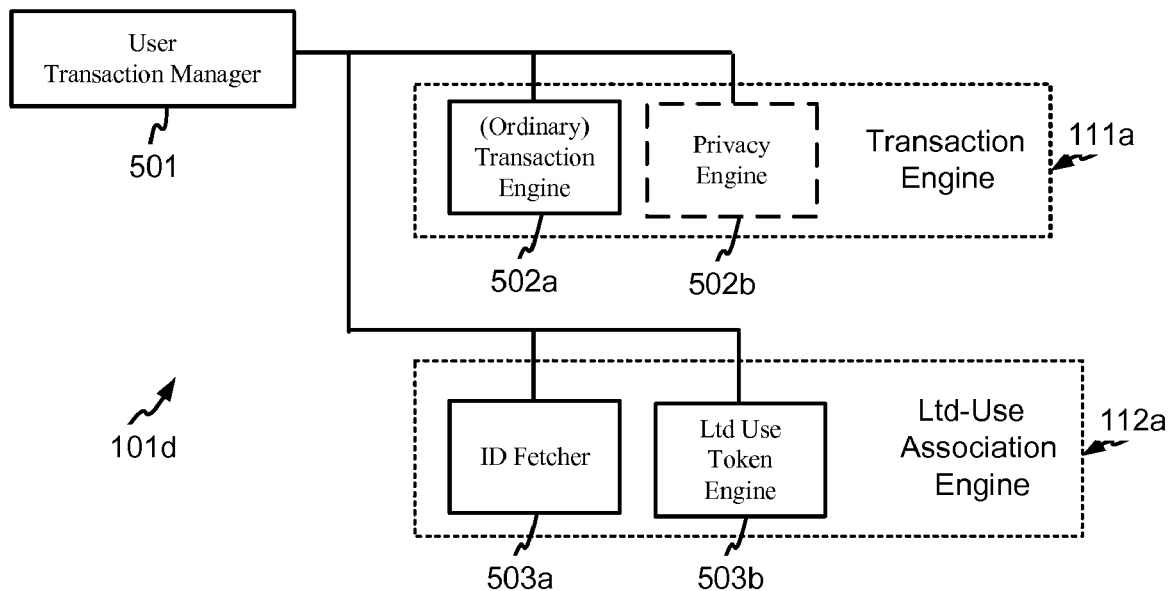
FIG. 5A is a flow diagram in accordance with an embodiment of the invention illustrating the user device of FIG. 1 in greater detail in conjunction with indirect associating.
Figure 5B:
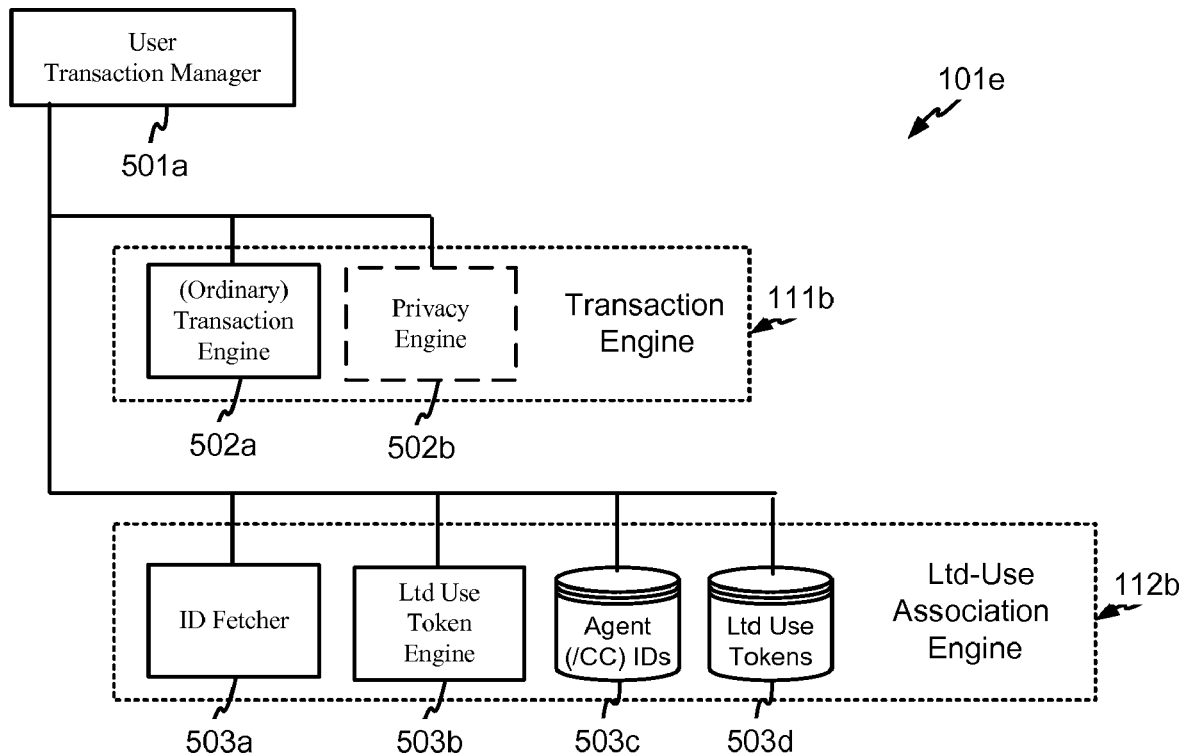
FIG. 5B is a flow diagram in accordance with another embodiment of the invention illustrating the user device of FIG. 1 in greater detail in conjunction with direct associating.

Referring now to FIGS. 5A and 5B, there are seen flow diagrams illustrating user devices 101d and 101e employing misuse avoidance security according to embodiments of the present invention. The first embodiment provides for indirect associating and per-transaction limited-use security, for example, wherein a use-limiting token or other limited-use indicator is received from a security center in conjunction with each transaction. The second embodiment provides for direct associating and lockstep type limited-use security, for example, wherein a user device retrieves from storage a limited-use token or other limited-use indicator As shown in FIG. 5A, user device 101d includes a user transaction manager 501 operatively coupled to transaction engine 111a and limited-use association engine 112a. Transaction engine 111a includes ordinary transaction engine 502a and optionally a privacy engine 502b. Ordinary transaction engine 111a provides for establishing a communications link with each of a security center and a contact center, enabling a user to select a product or service for purchase, arrange for shipping a shippable item, and complete a checkout procedure to consummate the business transaction with a business service. Such completing can, for example, correspond with the above discussed referring of a user/user device to a contact center. Privacy engine 502b provides for the aforementioned other security that might be used in accordance with a particular application. For example, privacy engine 502b can provide a firewall or fire-zone operate in conjunction with ordinary transaction engine to establish a secure connection, and provide for anti-spoofing and for encryption/decryption not otherwise provided by limited-use security components, and so on, in accordance with the requirements of a particular application.

Within limited-use association engine 112a, ID fetcher 503a provides for initiating transaction engine 111a to receive an agent identifier from a contact center. Limited-use token engine 503b further provides for sending to a security center an agent identifier and confidential user information, receiving therefrom a limited-use token and communicating the limited-use token and the confidential user information to the contact center for use in conjunction with a current transaction.

The user device embodiment of FIG. 5B includes a user transaction manager 501a operatively coupled to transaction engine 111b and limited-use association engine 112b. Transaction manager 501a provides for initiating other user device 101e components. Transaction engine 111b includes an ordinary transaction engine 502a and optionally a privacy engine 502b. Ordinary transaction engine 502a provides for establishing a communications link with each of a security center and a contact center, enabling a user to select a product or service for purchase, arrange for shipping shippable items, and complete a checkout procedure to consummate the business transaction with a business service. Privacy engine 502b provides for the aforementioned other security that might be used in accordance with a particular application, for example, in substantially the same manner as with privacy engine 502b of FIG. 5A.

Within limited-use association engine 112b, ID fetcher 503a provides for initiating transaction engine 111b to receive agent identifier and limited-use token lists from a security center prior to conducting a transaction with a contact center. Limited-use token engine 503b further provides, during a transaction, for receiving from a contact center an agent identifier corresponding to a contact center agent. Limited-use token engine 503b further provides for retrieving from storage and communicating to the contact center confidential user information and a limited-use token corresponding to the received agent identifier in conjunction with a current transaction.

Figure 6:
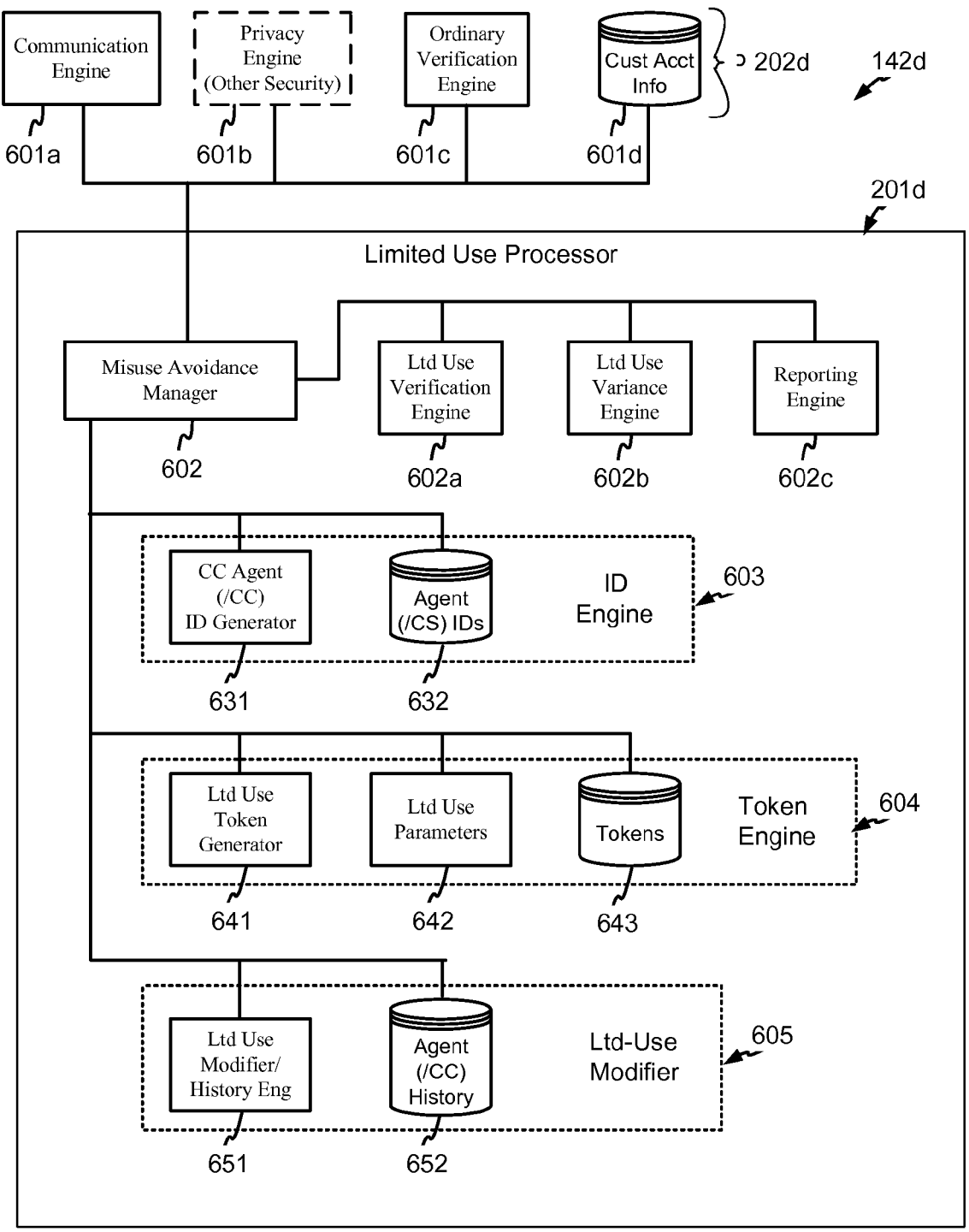
FIG. 6 is a flow diagram in accordance with another embodiment of the invention illustrating the security center of FIG. 2 in greater detail.

Referring now to FIG. 6, there is seen a flow diagram illustrating a security center 142d employing limited-use security according to an embodiment of the invention. As shown, security center 142d includes communicatively coupled components including limited-use processor 201d and transaction verification engine 202d. For clarity sake, we consider these components in a reverse order of their respective numbering.

Transaction verification engine 202d includes communication engine 601a, optional privacy engine 601b, ordinary verification engine 601c and customer account information storage 601d. Communication engine 601a provides for establishing a communications links with a user device and with a contact center. An optional privacy engine 601b provides for the aforementioned privacy security, for example, in substantially the same manner as discussed for the above user system embodiments.

Ordinary verification engine 601c provides for responding to a verification request received from a contact center by determining whether information that might be used for verification of a user transaction other than limited-use security indicates that the user is authorized to conduct the transaction. Such verification request can, for example, include a contact center sending to the security center user information, a limited-use token and any other information. The user information and other information can, for example, respectively include but are not limited to a user credit card account number, and a payment amount corresponding to a payment transaction. Such ordinary determining can, for example, include determining whether the user has a valid credit card account with a corresponding financial concern and whether the user is authorized to make payment from that account for the present transaction (e.g., according to the payment amount). Customer account information 601d stores customer account information for use by ordinary verification engine 601c.

Limited-use processor 201d includes misuse avoidance manager 602, limited-use verification engine 602a, limited-use variance engine 602b, reporting engine 602c, identification engine 603, token engine 604 and limited-use modifier 605. Misuse avoidance manager 602 provides for initiating other of the limited-use processor components and for communicating with transaction verification engine components.

Limited-use verification engine 602a provides for verifying the use of the confidential user information by a contact center, or more preferably a contact center agent, in conjunction with the current transaction, for example. Such limited-use verifying can include, for example, decoding of a received limited-use token if the limited-use token is encoded and determining whether requirements of an included limited-use indicator have been met by the contact center agent. For example, a time period limit can be checked to determine if the limited-use token prohibits a transaction from occurring outside of a permitted time interval.

Limited-use verifying can also, in one embodiment, more particularly include limited-use verification engine 602a receiving a token including an agent identifier, user information and a time-use limitation, as well as a token identifier. (A conventional network data identifier or an additional token identifier, such as a token number can, for example, be used.) Limited use verification engine 602a can respond to the verification request by comparing the agent identifier to stored agent identifiers (e.g., stored in agent ID storage 632 or of a limited-use token already provided by the security center to a user device) to determine whether the contact center agent seeking verification is authorized to conduct any transaction or the particular transaction using the current token. (A limited-use token can, for example, be stored by security center 142d in customer account storage 601d, e.g., as was already noted, and can be retained, discarded, flagged as used by a user, contact center or other business service, and so on, in conjunction with receiving a corresponding limited-use token from a contact center or other business service, or otherwise in accordance with a particular application.) Limited use verification engine 602a can further compare the time limitation of the current token with such prior provided token to determine whether the time limitation has been met. Limited use verification engine 602a can also compare the user information (e.g., credit card number) with that of the prior provided token to assure that the account is authorized. Limited use verification engine 602a can further compare the token identifier with tokens already received (from the contact center agent) to assure that the same contact center agent, while possibly meeting the time-limitation, is not attempting to re-use the token for a subsequent transaction, among other examples in accordance with a particular application.

Limited use variance engine 602b provides for enabling a variance from the limitation set forth by the limited-use indicator of the limited-use token. Reporting engine 602c provides for reporting to a security center agent the use or attempted use of confidential user information by one or more contact center agents corresponding to limited use tokens received by the security center.

Within identification engine 603, contact center agent identification generator 631 provides for generating agent identifiers corresponding to agents of at least one contact center. Agent identifier data 632 stores agent identifiers generated by contact center agent identification generator 631.

Token engine 604 includes a limited-use token generator 641, limited-use parameter engine 642 and limited-use token data 643. Limited-use token generator 641 provides for generating tokens to be used as limited-use tokens in conjunction with a user conducting a transaction with a contact center in a static or configurable manner using, for example, one or more of different use limitations, user information, transaction information, different approaches, and so on. Limited-use token generator 641 can further provide for generating limited-use tokens having one or more limitations, or having different limitation parameters that can be used to provide limited-use tokens having the same or different limitations or limitation amounts (e.g., the same or different time limitations) that can, for example, correspond to one or more contact centers, sellers, users, agents or agent groupings thereof, transaction histories or other information (e.g. using customer account information 601*d* or agent/contact center history 652), and so on.

For example, embodiments employing the agent identifier include the following approach embodiments. An embodiment of the shared secret approach includes a smart card having encryption capability thereon concatenating a rounded time indicator corresponding to a time limitation and an agent identifier, adding a user account number and encrypting the resultant unencrypted token to form a limited-use token. An embodiment of the digest approach includes a smart card having encryption capability thereon, a smart card having encryption capability thereon performing a keyed hash message authentication code or HMAC using the agent identifier as a number used once (i.e., a "nonce") and a rounded time indicator, for example, to avoid replay attacks.

An embodiment of the hash based chain of keywords approach employing the agent identifier includes selecting a password on a chain of passwords corresponding to a rounded time indicator of a time limitation and encrypting the user account number and the agent identifier using the selected password to form a limited-use token. The chain can, for example, be formed using a suitable hash technique. The user account number and agent identifier are encrypted together in one embodiment and separately encrypted in another embodiment. It will be appreciated that the limited-use token can be unencoded, including decrypting, by the security center. An embodiment of the public key approach includes a smart card or other user device storing a public and private key pair and a security center storing the public key. The user device combines a time identifier corresponding to a time limitation, a user account number and the agent identifier to produce a limited-use token. An embodiment of a one-time pad approach includes a smart card or other user device storing a one-time pad of keys as is known in the art.

Different embodiments can use different sets of information or factors to create the limited-use token. For example, the time identifier can be the time at which the token is generated, a time period within which the token must be used, a time period at which the token will expire, etc. A number of uses can limit the number of purchases, or the number of purchase events, that can be performed with the token. A maximum amount (e.g., a dollar amount) can be used beyond which a purchase will not be approved. The type of purchase, type of goods or services purchased, etc., can be restricted. A store location, type of store (e.g., government, non-profit, specific geographical location, affiliate, etc.) can be specified. In general, different approaches may use more or less information in the limited-use token than is presented herein. Other types of information can also be used than those types described herein. Factors for tokens can be created by applying various techniques including without limitation, a no secret approach, a shared secret approach, digest approaches, hash-based chain approaches, a public key approaches, and one-time pad approaches to particular ones of such token parameters.

Embodiments employing the agent public key, for example, can include different approaches. An embodiment of the "no secret" approach includes a smart card or other user device encrypting the user account number and a time indicator corresponding to a time limitation using the agent's public key, and concatenating the result with the user account number to form a limited-use token. An embodiment of the shared secret approach includes a smart card or other user device having encrypting capability thereon encrypting a shared secret and time indicator corresponding to a time limitation using the agent's public key to form a limited-use token. An embodiment of the digest approach includes a smart card or other user device conducting an HMAC digest, the digest being of rounded time indicator corresponding to a time limitation and either the users account number or the shared secret, and then encrypting the resulting unencrypted token using the agent's public key to form a limited-use token.

An embodiment of the hash based chain of keywords approach employing the agent's public key includes using a rounded time indicator of a time limitation to select a password on a chain of one-time passwords, and encrypting the user account number and the one-time password using the agent's public key to form a limited-use token. The chain can, for example, be formed using a secure hash technique. An embodiment of the public key approach includes a smart card or other user device storing a public and private key pair and a security center storing the public key. The user device further combines a time indicator corresponding to a time limitation and the user account number, and encrypts the result using the agent's public key to produce a limited-use token. An embodiment of a one-time pad approach includes a smart card or other user device storing a one-time pad of keys, choosing a key corresponding to a time limitation indicator and encrypting the result using the agent's public key to form a limited-use token.

Embodiments employing the IBE, for example, include the following approach embodiments. An embodiment of the no secret approach includes a smart card or other user device encrypting a user account number using an identifier formed by concatenating the agent's identifier and a rounded time indicator corresponding to a time limitation. An embodiment of the shared secret approach includes encrypting a shared secret using an identifier formed by concatenating the agent's identifier and the rounded time indicator corresponding to a time limitation. An embodiment of the digest approach includes a smart card or other user device conducting an HMAC digest of a rounded time corresponding to a time limitation and either the user's account number or the shared secret, and encrypting the result using the agent's public key. In this embodiment, the public key is formed from the rounded time indicator and the agent identifier.

An embodiment of the hash based chain of keywords approach employing the IBE includes selecting a password on a chain of passwords corresponding to a rounded time indicator of a time limitation, and then encrypting the resulting unencrypted token to form a limited-use token. The chain can, for example, be formed using a secure hash technique. In this embodiment, the public key is formed by encrypting the rounded time and the agent identifier. An embodiment of the public key approach includes a smart card or other user device storing a public and private key pair and a security center storing the public key. The user device combines a time indicator corresponding to a time limitation and an account number, and encrypts the resulting unencrypted token using the agent's public key to produce a limited-use token. In this embodiment, the public key is formed from the rounded time indicator and the agent identifier. An embodiment of a one-time pad approach includes storing onto a credit card a one-time pad of keys, choosing a key based on the time and encrypting the result using the agent's public key. In this embodiment, the public key is formed by encrypting the rounded time and the agent identifier.

It will be appreciated that each of the above approaches is subject to considerable variation. For example, further embodiments can include but are not limited to one or more of omission of the agent identifier, requiring a user entered personal identification number (PIN), user name, password, or other information, and so on.

Limited-use modifier 605 includes limited-use modifier/history engine 651 and agent/CC history storage. Limited use modifier/history engine 651 ("history engine") provides for receiving, storing, evaluating and providing to other security center 142*d* components history information corresponding to at least one contact center and its contact center agents. Such information can, for example, be received via limited-use verification of limited-use tokens, ordinary verification, and other sources of such information or combinations thereof. Such information can further be evaluated alone or in combination with customer account information or other factors to determine, for example, an initial user, contact center, agent or transaction based use limitation for inclusion in a limited-use token or in conjunction with variance engine determination of a whether to authorize or accept a variance from such use limitation.

It will be appreciated in view of the foregoing that, while using an agent identifier and rounded time are preferred, other types of information can also be used (e.g., time, place, company ID, user information, and so on), preferably but not necessarily in conjunction with the agent identifier/rounded time, in accordance with the requirements of a particular application. More than one type of information might also be used. Such information might also be transferred or otherwise provided at different times or from different locations, in accordance with a particular application.

Figure 7:
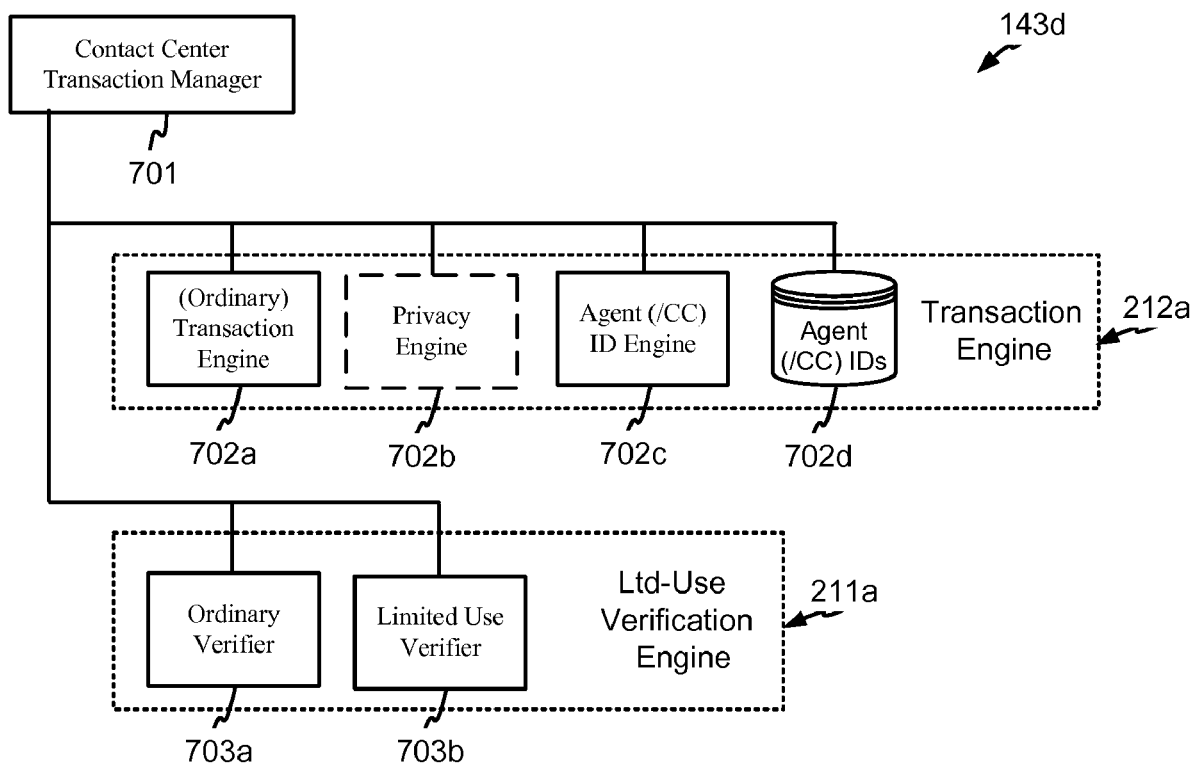
FIG. 7 is a flow diagram in accordance with another embodiment of the present invention illustrating in greater detail the hosted contact center of FIG. 2.

Turning now to FIG. 7, there is seen a flow diagram illustrating a contact center 143*d* employing misuse avoidance according to an embodiment of the invention. Contact center 143*d* includes communicatively coupled components including contact center transaction manager 701, transaction engine 212*a* and limited-use verification engine 211*a*. Contact center transaction manager 701 provides for initiating other contact center 143 components. Transaction engine, which provides for conducting business transactions with a user, includes transaction engine 702*a*, optional privacy engine 702*b*, agent identification engine 702*c* and agent identification storage 702*d*. Ordinary transaction engine 702*a* provides for establishing a communications link with each of a user device and a security center respectively for providing an agent identifier and receiving user information and a limited use token, and for receiving one or more agent identifiers and conducting ordinary or limited use verification. Privacy engine 702*b* provides for the aforementioned other security that might be used in accordance with a particular application. Agent identifier engine 702*c* provides for receiving the one or more agent identifiers and for providing an agent identifier to a user device, which agent identifier agent identifier engine 702*c* stores in agent identifier storage 702. Within limited use verification engine 211*a*, ordinary verifier provides for conducting conventional verification, for example, initiating sending of a user's credit card number and payment amount to a security center and receiving from the security center and evaluating a resultant approval or denial indicator on that basis. Limited-use verifier 703*b* further provides for conducting limited-use verification, for example, initiating sending of a limited-use token to a security center and receiving from the security and evaluating a resultant approval or denial indicator on the basis of the limited use.

Figure 8:
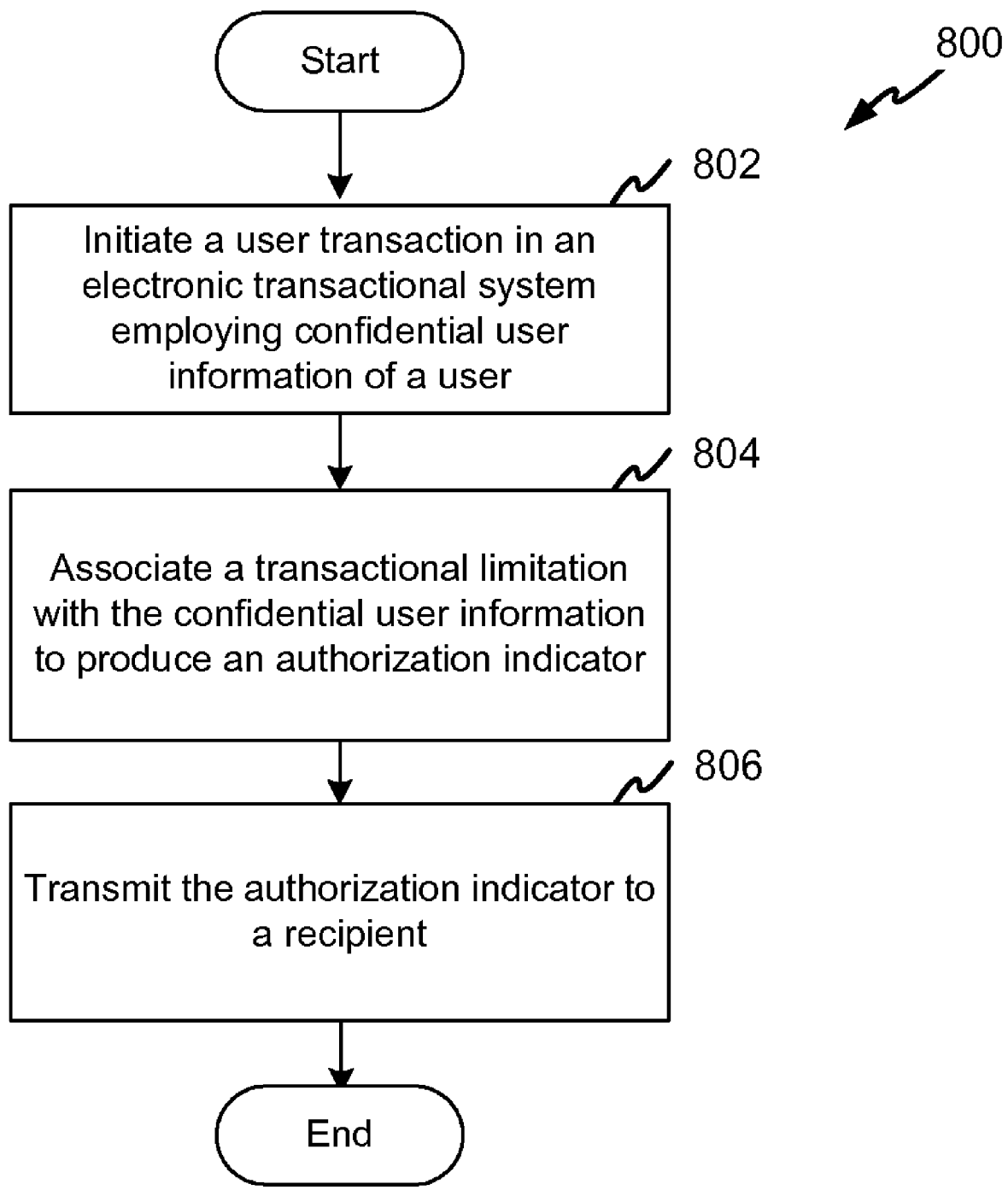
FIG. 8 is a flowchart in accordance with another embodiment of the present invention illustrating a misuse avoidance method.

The FIG. 8 flow chart illustrates a method for protecting confidential user information employed in an electronic user transaction in accordance with one embodiment of the present invention. As depicted, in block 802, a user transaction is initiated. The user transaction is initiated in an electronic transactional system employing confidential user information of a user. In block 804, a transactional limitation is associated with the confidential user information to produce an authorization indicator. In block 806, the authorization indicator is transmitted to a recipient.

Figure 9:
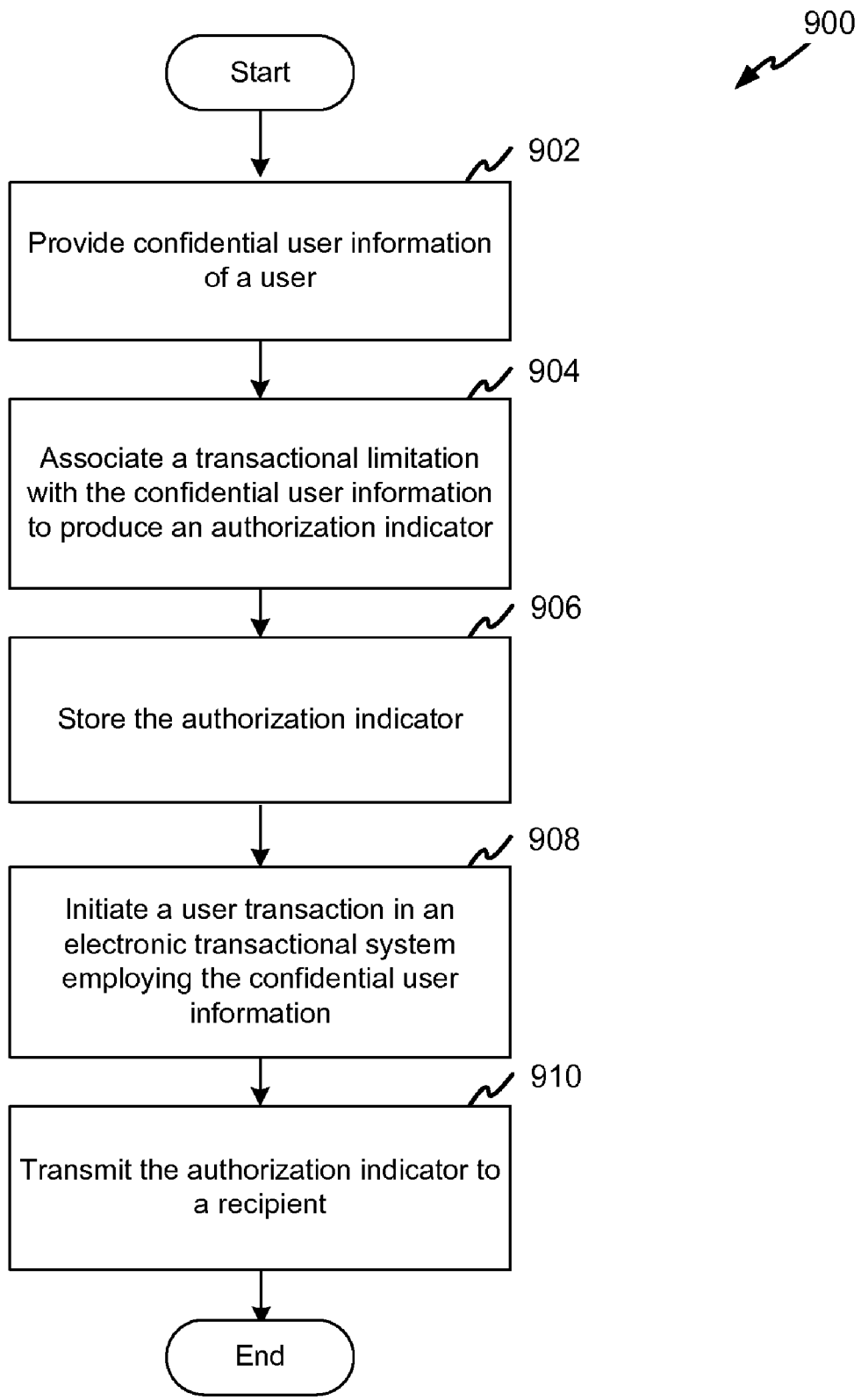
FIG. 9 is a flowchart illustrating in accordance with another embodiment of the present invention a further misuse avoidance method.

The FIG. 9 flow chart illustrates a method for protecting confidential user information employed in an electronic user transaction in accordance with one embodiment of the present invention. In block 902, confidential user information is provided. In block 904, a transactional limitation is associated with the confidential user information to produce an authorization indicator. In block 906, the authorization indicator is stored. In block 908, a user transaction in an electronic transactional system employing the confidential user information is initiated. In block 910, the authorization indicator is transmitted to a recipient.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus comprising:
   one or more processors; and
   logic encoded in one or more tangible media for execution by the one or more processors and when executed operable to:
   initiate a transaction with an agent in a contact center;
   receive an agent identifier for the agent from the contact center;
   determine a limited use indicator, the limited use indicator received from a provider and corresponding to the agent identifier;
   send the limited use indicator with confidential information to the contact center for authorization in the transaction, wherein the contact center communicates the limited use indicator and the confidential information to the provider for verifying whether the limited use is met in the transaction; and
   receive, from the contact center, an authorization indication whether the limited use is met.

2. The apparatus of claim 1, further comprising:
   sending the confidential information and the agent identifier to the provider; and
   receiving the limited use indicator from the provider, the provider determining the limited use indicator based on the confidential information and the agent identifier.

3. The apparatus of claim 1, wherein the logic when executed is further operable to:
   receive one or more limited use indicators for one or more agent identifiers;
   store the one or more limited use indicators; and
   determine a limited use indicator in the one or more limited use indicators based on the agent identifier for the agent, wherein the determined limited use indicator is sent to the contact center with the confidential information.

4. An apparatus comprising:
   one or more processors; and
   logic encoded in one or more tangible media for execution by the one or more processors and when executed operable to:
   send, from a contact center, an agent identifier to a user device for a transaction being conducted between the user device and the contact center, wherein the user device associates confidential information and a limited use indicator that is received from a provider and corresponds to the agent identifier;
   receive the limited use indicator and the confidential information from the user device;
   send the limited use indicator and the confidential information to the provider for verifying whether the limited use is met and whether the transaction should be authorized in accordance with the limited use; and
   receive a response from the provider indicating whether the transaction should be authorized in accordance with the limited use.

5. The apparatus of claim 4, wherein the logic when executed is further operable to:
   send verification information with the limited use indicator and the confidential information to the provider; and
   receive a verification response indicating whether the transaction is allowable without taking into account the limited use.

6. The apparatus of claim 4, wherein the logic when executed is further operable to:
   receive the agent identifier from the provider; and
   assign the agent identifier to an agent handling the transaction in the call center.

7. An apparatus comprising:
   one or more processors; and
   logic encoded in one or more tangible media for execution by the one or more processors and when executed operable to:
   send a limited use indicator to a user device, wherein the user device associates the limited use indicator with confidential information and an agent identifier for an agent of a call center for a transaction, wherein the limited use indicator corresponds to the agent identifier;
   receive a verification request from the call center, the verification request including the limited use indicator and the confidential information;
   verify whether the limited use is met and whether the transaction should be authorized in accordance with the limited use based on the limited use indicator and the confidential information; and
   send a response to the call center indicating whether the transaction is authorized in accordance with the limited use.

8. The apparatus of claim 7, wherein the logic when executed is further operable to:
   receive the agent identifier and the confidential information from the user device;
   determine the limited use indicator corresponding to the agent identifier and the confidential information; and
   send the limited use indicator to the user device.

9. The method of claim 7, wherein the logic when executed is further operable to:
   send one or more limited use indicators for one or more agent identifiers; and
   receive a limited use indicator in the one or more limited use indicators in the verification request, wherein the user device uses the agent identifier for the agent to determine the limited use indicator for the transaction.

10. A system comprising:
an electronic transactional system comprising:
one or more processors; and
logic encoded in one or more tangible media for execution by the one or more processors and when executed operable to:
initiate a user transaction employing confidential user information of a user;
associate with the confidential user information a limited-use indicator indicating a limited use of the confidential user information to produce an authorization indicator;
transmit the authorization indicator to a recipient for use in conducting the user transaction;
a user device comprising:
one or more processors; and
logic encoded in one or more tangible media for execution by the one or more processors and when executed operable to:
receive an agent identifier of a contact center agent, wherein the agent identifier is provided by a provider;
communicate, by the user device to the provider, the agent identifier and the confidential user information; and
transmit the authorization indicator to the provider for verifying whether the limited use is met and whether the transaction should therefore be authorized in accordance with the limited use.

11. The system of claim 10, further comprising a provider device, the provider device comprising:
one or more processors; and
logic encoded in one or more tangible media for execution by the one or more processors and when executed operable to assign an agent identifier identifying recipient agents, the authorization indicator including an indicator corresponding to the agent identifier.

12. The system of claim 10, wherein the user transaction comprises a payment transaction between the user and a hosted contact center.

13. The system of claim 10, wherein the confidential user information comprises electronic payment information.

14. The system of claim 10, wherein the logic operable to associate comprises:
logic operable to receive, by the user device from the electronic transaction center, the authorization indicator, the authorization indicator including an indicator corresponding to the limited-use indicator.

15. The system of claim 14, wherein the authorization indicator comprises a limited-use token.

16. The system of claim 15, wherein the limited-use token is generated from token parameters including the agent identifier, a public key of the contact center agent and an identity based encryption (IBE).

17. The system of claim 10, wherein the user device comprises
logic operable to receive, from a contact center, an agent identifier of a contact center agent; and
logic operable to retrieve, according to the agent identifier, the authorization indicator including an indicator corresponding to the limited-use indicator.

18. The system of claim 17, wherein the authorization indicator comprises a limited-use token.

19. The system of claim 18, wherein the limited-use token is generated from token parameters including to the agent identifier, a public key of the contact center agent and an identity based encryption (IBE).

20. The system of claim 10 wherein the transactional limitation comprises a time indicator indicating a time during which the transaction will be authorized and after which authorization of the transaction will be denied.

* * * * *